United States Patent
Quentin et al.

(10) Patent No.: US 10,997,602 B2
(45) Date of Patent: May 4, 2021

(54) PAYMENT CONTAINER, METHOD FOR CREATING, METHOD FOR PROCESSING, CORRESPONDING DEVICES AND PROGRAMS

(71) Applicant: INGENICO GROUP, Paris (FR)

(72) Inventors: Pierre Quentin, Eighien les Bains (FR); Vincent Ducrohet, Saint-Cyr-l'Ecole (FR); Michel Leger, Saint Germain en Laye (FR)

(73) Assignee: INGENICO GROUP, Paris (FR)

( * ) Notice: Subject to any disclaimer, the term of this patent is extended or adjusted under 35 U.S.C. 154(b) by 609 days.

(21) Appl. No.: 15/201,547

(22) Filed: Jul. 4, 2016

(65) Prior Publication Data
US 2017/0004502 A1 Jan. 5, 2017

(30) Foreign Application Priority Data
Jul. 3, 2015 (FR) ...................................... 1556349

(51) Int. Cl.
*G06Q 20/40* (2012.01)
*G06Q 20/38* (2012.01)
(Continued)

(52) U.S. Cl.
CPC ......... *G06Q 20/409* (2013.01); *G06Q 20/102* (2013.01); *G06Q 20/322* (2013.01);
(Continued)

(58) Field of Classification Search
CPC .... G06Q 20/102; G06Q 20/409; G06Q 20/38; G06Q 20/382; G06Q 20/322
(Continued)

(56) References Cited

U.S. PATENT DOCUMENTS

| 2004/0019571 A1* | 1/2004 | Hurwitz | G06Q 20/06 705/65 |
| 2007/0203847 A1* | 8/2007 | School | G06Q 20/04 705/64 |

(Continued)

FOREIGN PATENT DOCUMENTS

| KR | 20120105296 A | 9/2012 |
| WO | 2014/162296 A1 | 10/2014 |

OTHER PUBLICATIONS

English abstract of KR20120105296 retrieved from Espacenet on Jul. 4, 2016.
(Continued)

*Primary Examiner* — Lindsay M Maguire
(74) *Attorney, Agent, or Firm* — BCF LLP

(57) ABSTRACT

The technology relates to a method for creating a payment data structure called a payment container. The technology also relates to the use of such a payment container by means of a processing server. The method for creating is implemented by a communications terminal, and comprises: selection, by a user and via a man-machine interface, of at least one attribute of said container, comprising the selection of at least one attribute value for at least one of the following parameters: (a) category of beneficiary of the payment container and (b) beneficiary of the payment container. The method also comprises obtaining, by the communications terminal, of at least one piece of data representing a user's bank card; validation, by the user, of the creation of the payment container; and transmission, by said communications terminal, of said payment container to a payment container processing server.

12 Claims, 2 Drawing Sheets

Figure 1:
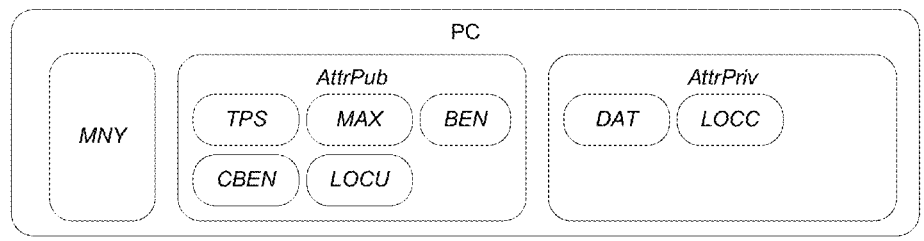

(51) Int. Cl.
    *G06Q 20/32* (2012.01)
    *G06Q 20/10* (2012.01)
    *G06Q 40/02* (2012.01)
(52) U.S. Cl.
    CPC ........... *G06Q 20/38* (2013.01); *G06Q 20/382* (2013.01); *G06Q 40/02* (2013.01)
(58) Field of Classification Search
    USPC .......................................................... 705/40
    See application file for complete search history.

(56) References Cited

U.S. PATENT DOCUMENTS

| | | | | |
|---|---|---|---|---|
| 2012/0023567 | A1* | 1/2012 | Hammad | G06Q 20/12 726/9 |
| 2012/0150687 | A1* | 6/2012 | Hart | G06Q 30/0613 705/26.41 |
| 2012/0203700 | A1* | 8/2012 | Ornce | G06Q 20/3278 705/67 |
| 2014/0108260 | A1* | 4/2014 | Poole | G06Q 20/3226 705/64 |
| 2015/0254647 | A1* | 9/2015 | Bondesen | G06Q 20/36 705/41 |

OTHER PUBLICATIONS

Preliminary search report from FR1556349, dated Feb. 29, 2016, AUPIAIS, Brigitte.
Official Action from EPO with regard to the counterpart EP Patent Application No. 16177234.8 dated Jul. 4, 2019.

* cited by examiner

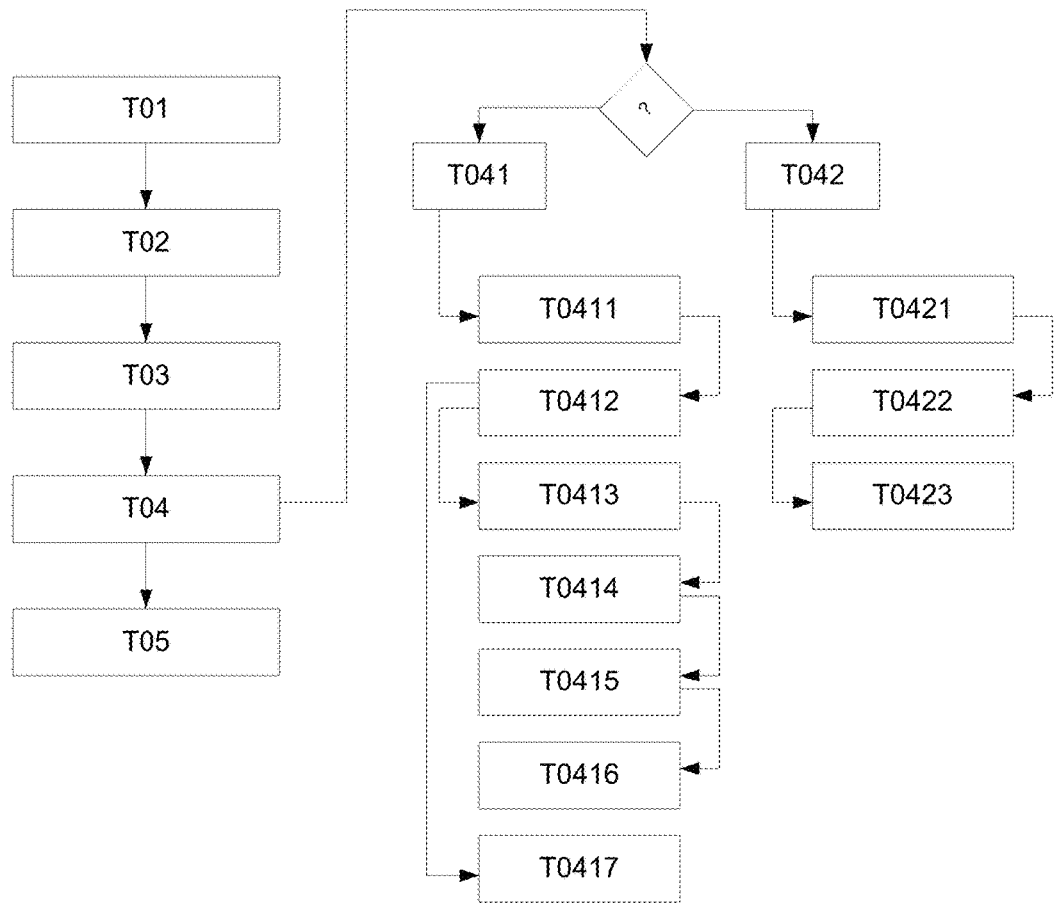
Figure 3
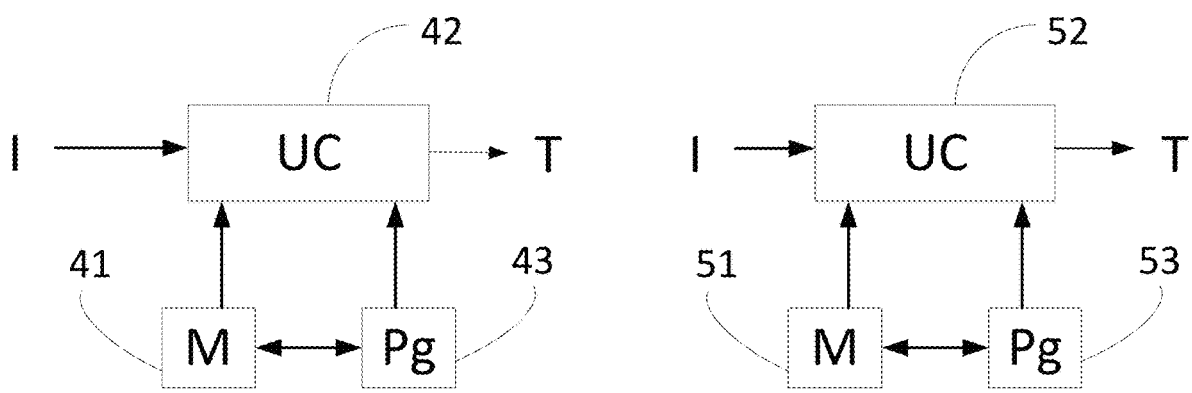
Figure 4
Figure 5

PAYMENT CONTAINER, METHOD FOR CREATING, METHOD FOR PROCESSING, CORRESPONDING DEVICES AND PROGRAMS

CROSS-REFERENCE TO RELATED APPLICATION

This United States Non-Provisional Patent Application claims priority from French Patent Application Serial No. 15 56349, filed on Jul. 3, 2015, the entire content of which is incorporated herein by reference.

FIELD OF THE TECHNOLOGY

The present technique concerns the problems and issues related to payment. More particularly, the technology concerns the problems and issues related to payment by bank card. In Europe, bank cards are the most widely used means of payment. Bank cards are used physically to make payments to merchants as well as to make payments online. However, a bank card is also subject to fraud.

BACKGROUND

A bank card is used to make purchases by two different types of methods: "card present" type purchases are made when the user physically presents his bank card to a merchant who has a physical payment terminal. In this configuration, depending on the country, the prevailing legislation and the payment terminals available, the user (the purchaser) can use either a smartcard or a magnetic stripe card (this is the case for example in the United States), or again he can use a contactless card. There are also multimode cards which use the three technologies mentioned above. "Card not present" (CNP) type purchases can also be made using a bank card. These are mainly online purchases and also purchases by telephone made by using a computer, a tablet, a smartphone or a telephone. To make this type of purchase, the user makes an entry or orally communicates visual data on his card: card number, date of validity, bearer's name, visual cryptogram (or security code). These pieces of data are transmitted by means of a communications network to one or more servers so that payment can be made.

The difference between these two types of payment is a major one. Easy as it may be to use a bank card in "card present" mode, it is also tedious to have to enter one's bank card data in the forms used in web pages. Thus, many individuals store their credit card data in a file in order to make payment operations simpler. There are solutions used to manage this data in a centralised way (for example by DashLane™). These software solutions, installed on the communications device (his computer or tablet) enable the automatic entry, in the fields provided for this purpose, of the data which has been previously entered into the software program. However, on the one hand this approach makes it necessary to enter this data in a third-party software program which has to be installed beforehand in the user's communications device. On the other hand, this solution requires trust in the editor of this software program for the preservation of this data. Online solutions also exist: they make it possible not to have to install software programs on the user's communications device but they nevertheless require trust in an editor (for example Google™) for the preservation of this data. Now, this trust has greatly deteriorated in recent years. Besides, this solution of preserving bank card data in a communications device raises problems in case of theft or loss of the communications device.

Another solution called a "card on file" approach is used to store bank card data directly with the merchant. The merchant keeps the bank card data within his software infrastructure. This simplifies the payment process since, once the user is identified, all that is needed for the payment to be effective is acceptance of the payment. This solution however is not advantageous because it requires trust in all the online merchants likely to have the user's bank card data at their disposal (as it happens, it is necessary above all to have trust in the infrastructures of these merchants, and to have trust in the fact that they are protected against theft or identify theft). This solution is moreover not a definitive one because when the card comes to an end (for example when it reaches its expiry date), it becomes necessary to update all the bank data on the websites of organisations with which a "card on file" approach has been implemented (for example credit organisations, insurance organisations, etc.). Finally, the main problem related to the "card on file" technique is that one gives one's bank card data without any assurance as to its final destination or its final use.

In general, bank card fraud is mainly carried out on online payments. However, the loss or theft of a bank card is an event that can have major repercussions for the individuals involved: these repercussions include cash withdrawals (especially if the theft of the card is accompanied by theft of the confidential code of this card), online payments.

SUMMARY OF THE TECHNOLOGY

The present technique does not have these drawbacks of the prior art. More particularly, the present technique relates to a method for processing transactional data in a secured manner which offers a high level of usability for consumers. Through the present technique, the payment can be made in full security with a low level of fraud. Besides, the proposed solution is simple for the user and does not slow down the payment.

More particularly, according to a first aspect, a method is disclosed for creating a payment data structure called a payment container, the method for creating implemented by a mobile communications terminal, said payment container comprising at least one piece of data representing a user's bank identifier.

According to the present technique, the method comprises:
  the selection by the user and by means of a man-machine interface, of at least one attribute of said container, said selection comprising the selection of at least one attribute value for at least one of the following parameters: category of beneficiary of the payment container; beneficiary of the payment container;
  the obtaining, by the communications terminal, of at least one piece of data representing the user's bank card;
  the validation, by the user, of the creation of the payment container;
  the transmission, by said communications terminal, of said payment container to a payment container processing server.

Thus the user, in a simple and secured way, can define a sum of money which he can thereafter use to make a payment without having any need to use his bank card.

According to one particular embodiment, said step in which the communications terminal obtains at least one piece of data representing the user's bank card comprises:

a step of transmission, to said bank card and by means of a contactless data transmission interface, of a request for obtaining data in the form of a signal;

a step for receiving a response to said request, in the form of a modulated signal;

a step for decoding said modulated signal delivering said at least one piece of data.

Thus the user does not even need to enter the bank card data; it is enough for him to place this bank card on his communications terminal.

According to one particular embodiment, said step for the obtaining, by the communications terminal, of at least one piece of data representing the user's bank card comprises:

a step for activating a device for taking pictures of the communications terminal;

a step for obtaining an image of the bank card by means of the device for taking pictures;

a step for implementing a character recognition module, on the basis of the image of the bank card, delivering said at least one piece of data.

Thus, the user does not even need to enter his bank card data; it is enough for him to take a picture of his bank card using his communications terminal According to one particular characteristic, the method furthermore comprises a step for the determining, by means of said communications terminal, of a value representing an attribute of transmission of said payment container.

According to one particular characteristic, the method comprises a step, when the value representing the transmission attribute of said payment container is positive, for the determining, by said communications terminal, of a value representing an attribute of debit from said payment container.

According to one particular characteristic, the method for creating is characterised in that it comprises, prior to the selection of a container parameter:

the activation, on the user's communications terminal, of a module for managing the payment container;

the selection, within this module, of a mode of operation called a container creation mode.

According to one particular characteristic, the activation of the management module is accompanied by the authentication of said user to whom said communications terminal and said payment card belong.

According to one particular embodiment, the selection by a user and through a man-machine interface of at least one attribute of said container comprises the selection of at least one attribute value for at least one of the following parameters:

date of validity of the payment container;
duration of validity of the payment container;
amount of the payment container.

In another embodiment, the technique also relates to a device for the creation of a payment data structure called a payment container, said payment container comprising at least one piece of data representing a user's bank identifier.

Such a device comprises at least one module configured to enable:

the selection, by a user and through a man-machine interface, of at least one attribute of said container, said selection comprising the selection of at least one attribute value for at least one of the following parameters:
category of beneficiary of the payment container;
beneficiary of the payment container;

the obtaining, by the communications terminal, of at least one piece of data representing the user's bank card;

the validation, by the user, of the creation of the payment container;

the transmission, by said communications terminal, of said payment container to a payment-container processing server.

Such a module can take a hardware or software form. In a hardware form, such a module takes, for example, the form of a secured processor specially configured to implement the proposed technique.

According to a second aspect, a method is also disclosed for the processing, by a processing server, of a payment data structure, called a payment container, said payment container being used with a merchant by a user having a communications terminal linked to said payment container, the method being characterised in that it comprises the following steps:

receiving data from the payment terminal, comprising the identifier of the payment container;

obtaining a merchant's identifier, possibly accompanied by a merchant category code when this code is not provided by the merchant;

depending on the payment container identifier, determining an identifier of a banking institution to which the payment container is attached;

depending on the banking identifier of the payment container, obtaining an authorization of payment, said step for obtaining an authorization of payment comprising a step for verifying that said merchant's identifier and/or merchant category code are among attributes values of the following parameters of said payment container:
category of beneficiary of the payment container, as for said merchant category code;
beneficiary of the payment container, as for said merchant's identifier; and when the authorization of payment is delivered, a step of transmission to the merchant's terminal, of a piece of date representing acceptance of the transaction.

Thus, a payment can be implemented by means of a payment container without requiring the intervention of a bank card used to create this payment container.

According to one particular embodiment, said step for obtaining an authorisation of payment comprises the following steps:

when the banking institution of the payment container is the same as the banking institution of the processing server:
obtaining attributes of the container;
verifying the balance remaining within the payment container;
when the balance remaining within the payment container is greater than the amount of the transaction:
verifying that none of the attributes of the payment container contradicts the data of the transaction;
when none of the payment attributes is infringed, issuing authorization of payment;
subtracting an amount of the transaction from the balance remaining within the payment container;
when the balance remaining within the payment container is smaller than the amount of the transaction, transmitting an absence of authorization.

According to one particular embodiment, said step for obtaining a payment authorisation comprises the following steps:

when the banking institution of the payment container is different from the banking institution of the processing server;

identifying the processing server to which the transaction data must be transmitted;

transmitting the data of the transaction to the processing server;

receiving authorisation or rejection of payment.

The technique also relates to a server for processing a payment data structure, called a payment container, said payment container being used with a merchant by a user having available a communications terminal linked to said payment container. Such a server comprises means for:

receiving data coming from the payment terminal, comprising the identifier of the payment container;

obtaining a merchant's identifier, possibly accompanied by a merchant category code when the code is not provided by the merchant;

depending on the identifier of the payment container, determining an identifier of a bank institution to which the payment container is attached;

depending on the bank identifier of the payment container, obtaining an authorization of payment, said obtaining of an authorization of payment comprising the verification that said merchant's identifier and/or merchant category code are among attributes values of the following parameters of said payment container:

category of beneficiary of the payment container, as for said merchant category code;

beneficiary of the payment container, as for said merchant's identifier; and when the authorization of payment is delivered, a step of transmission, to the merchant's terminal, of a piece of data representing acceptance of the transaction.

Other aspects of the present technique are also disclosed in the present description.

According to a preferred implementation, the different steps of the method according to the proposed technique are implemented by one or more software programs or computer programs comprising software instructions to be executed by a data processor of a relay module according to the proposed technique and being designed to command the execution of the different steps of the methods.

The technology is therefore also aimed at providing a program that can be executed by a computer or by a data processor, and especially a secured processor, this program comprising instructions to command the execution of the steps of a method as mentioned here above.

This program can use any programming language whatsoever and can be in the form of a source code, object code or a code that is intermediate between source code and object code, such as in a partially compiled form or in any other desirable form.

The proposed technique also aims to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the technology can be especially uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component as to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

Each component of the system described here above naturally implements its own software modules.

The different embodiments mentioned here above can be combined with one another to implement the proposed technique.

LIST OF FIGURES

Figure 2:
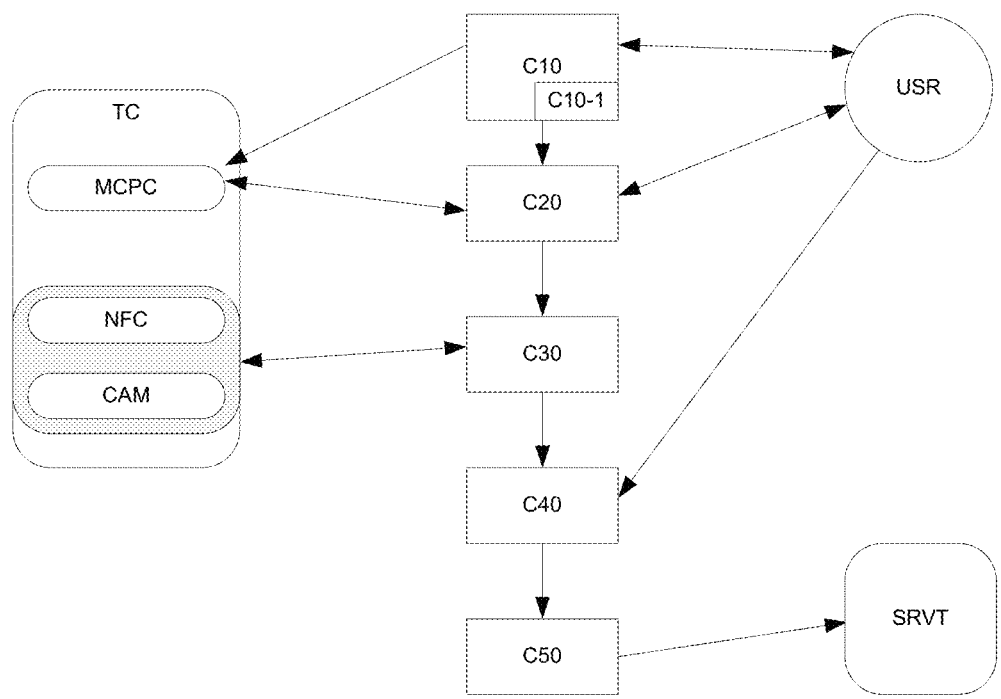

Other features and advantages of the proposed technique shall appear more clearly from the following description of a preferred embodiment, given by way of a simple illustratory and non-exhaustive example and from the appended drawings, of which:

FIG. 1 presents a payment container according to the present technique;

FIG. 2 describes the steps implemented to create a payment container;

FIG. 3 depicts the steps implemented, on the server side, to use a payment container;

FIG. 4 provides a brief description of the physical architecture of a device for the creation and use of a payment container;

FIG. 5 provides a brief description of the physical architecture of the processing server.

DESCRIPTION

As explained above, the object of the present technology is to simplify the operations of payment in particular situations. The technique is therefore aimed at responding to a set of problems and issues related to payment and the transfer of money. The proposed technique applies especially well to the use (payment, transfer) of a certain quantity of money without any need to use one's bank card. The technique is based especially on the application of a payment container which comprises a certain number of information elements to make a payment in a simple and speedy manner. The technique described relates also to the processing of payments made with the payment container. These processing operations are chiefly made with a transaction processing server, also called a processing server. Depending on the embodiments and operational conditions, such a processing server can be a bank server (i.e. a server of a banking institution). It can also be an intermediate server (for example a hub server which takes charge of organising and processing all the transactions of a group of given tradesmen and/or shopkeepers). It can also be an intermediate server which sets up a link between bank servers belonging to different banking institutions.

1.1. Payment Container

The payment container is a data structure which can, if necessary, be enciphered (and therefore secured) and which contains a certain number of pieces of information on a sum of money. The payment container can be defined as an envelope containing a certain sum of money associated with a bank card of a determined bank account (in this case the bank account of the user who has created the payment container). FIG. 1 illustrates the payment container (PC).

Depending on the embodiments and the operational applications, this sum of money (MNY) is accompanied by a certain number of attributes: there are attributes that are "public" (AttrPub) and others that are "private" (AttrPriv). Among the possible public attributes, there is especially a piece of time-related data (TPS) which can be a duration of use or a limit date of use, a maximum amount (MAX), a beneficiary (BEN) and/or a category of beneficiary (CBEN), the location of use (LOCU). Other pieces of data, for security and regulatory purposes, are private (AttrPriv) and can be included: these are, for example, the date (DAT) when the container is created, the place (approximate or not) (LOCC) of this creation. The private attributes are used to guarantee the non-repudiation of the payment container. They also enable prevention of fraud. A certain number of private attributes are inserted by the processing server itself during the validation by the terminal. These private attributes are not modifiable by the users.

Each attribute of the payment container has a predetermined function:
  the date of validity determines a limit date of use of the payment container; beyond this date, the container can no longer be used; the limit date is appreciably equal in terms of function to the limit duration: once the limit duration has passed, the container can no longer be used;
  the maximum amount does not determine the amount of the container. The maximum amount determines the maximum amount of money for which the container can be used each time; for example, a container can contain a sum of 100 £ and the maximum amount can be fixed at 20 £. This means that a transaction using this container will be limited to a maximum amount of 20 £;
  the category of beneficiary determines the type of merchant with whom the container can be used. For example, the user can choose to limit the use of the container to shops of the "food" type excluding "tobacco" shops; this aspect is explained in greater detail below;
  the beneficiary determines one particular merchant with whom the container can be used; this aspect is described in detail below;
  the location of use defines a geographical sphere within which the container can be used (a town, a region, a country, etc).

With regard to the beneficiary, or the category of beneficiary, the technology offers the user the possibility of determining the type of purchase allowed with the container. The user thus has the possibility of restricting the use of the container. Thus, even when a malicious individual manages to procure the user's communications terminal and succeeds in launching a payment operation with the container, the verification of the beneficiary or the category of the beneficiary of the container ensures that the malicious individual will not be able to use the container as he wishes. This locking of the payment container is made possibly by comparing the MCC (Merchant Category Code) defined for this merchant with a list of MCCs authorised by the creator of the payment container.

As for the beneficiary, the principle is the same as above: instead of selecting one or more MCCs, the user selects one or more merchant identifiers with which he wishes that the container should be usable.

Once the payment container has been created (see below), it is transmitted to the processing server to be registered therein. A processing server is deemed to have sufficient security measures at its disposal for the payment container to be registered within the server in decrypted form. However, it can also happen that the payment container is not transmitted to a processing server but directly to another communications terminal of another user. In this case, it is transmitted in encrypted form.

A payment container can also comprise an "overdrawn" attribute, the use of which can be limited (for example it is not used for transmission and/or for an immediate debit): the "overdrawn" attribute can define a percentage of authorised overdraft, either for the amount of the container or for the maximum authorised amount. Such an attribute makes it possible to fix a range of maximum amount without being too strict on the amount itself.

It can be noted that the payment container according to the present technique is not a wallet such as for example the Google™ or Paypal™ wallets. Indeed, these wallets do not have the attributes defined for a payment container. In particular, they do not contain any allocated amount nor do they contain a duration of use or a category of beneficiary. These wallets are limited to setting up a link between a user's account number and credit card number within a banking institution and a mobile communications terminal.

It can also be noted that the payment container is not a debit pre-authorisation. Indeed, the processing server which keeps the payment container does not immediately debit the user's account during the creation or reception of this container. Nor does it reserve any sum of money: this means that no money is subtracted from the amount authorized for the customer's bank card (as is done for example when a guarantee deposit is made with a bank card). If the container is not used (for example because the time limit for the use of the container has been past before it is used in any way), then no debit is made on the customer's account and no money is subtracted from the overall authorised amount in the card. In a pre-authorisation, on the contrary, although no sum of money is debited at the time of the pre-authorisation, a subtraction is made from the payment ceiling of the bank card. Such a subtraction does also raise numerous problems for card-holders because it can cause the card to be blocked even when no payment really has been made. Besides, an authorisation of payment cannot be given concrete shape (in the form of a real payment) except by the merchant who has made this pre-authorisation and not by any merchant whatsoever, unlike with the payment container.

In one specific embodiment, the payment container can be the object of an immediate debit from the user's bank account. Such a situation can occur when the payment container is transmitted to a third party for use by a person who is not the creator of the payment container. When the user creates a payment container intended for a third party, the creator can attach value to a specific attribute, called a transmission attribute, indicating that the payment is not intended for him. The third party for whom the attribute is intended is not necessarily known at the time of creation of the payment container. When the transmission attribute is given the value "true", this opens the possibility of attaching value to a sub-attribute (a dependent attribute) called a debit attribute. The debit attribute is used to indicate either that the payment container must be subjected to an immediate debit (an attribute given the value "true"), or that the payment container should not be subjected to an immediate debit (an attribute given the value "false").

When an immediate debit is required, the amount of the payment container is debited from the user's bank account by the application of an EMV type bank card transaction. For the user who is the creator of the payment container, this is a classic bank card transaction.

When no immediate debit is required, the user's account is debited on the basis of several parameters which shall be explained below.

1.2. Creation of a Payment Container 1.2.1. Creation of a Container on a Communications Terminal It may be recalled that one of the problems that the payment container is trying to respond to is that of enabling the users of smart communications terminals (of the smartphone type) to permanently have available a simple and secured payment means which replaces the bank card. Indeed, many users are worried about a possible loss or theft of their cards. The payment container offers such a possibility. Still, the payment container must also respond to a number of other demands, especially in terms of ease of creation. The present method is described with reference to FIG. 2.

The inventors have thus had the idea of applying a method based on the use of a smartphone type of smart communications terminal (TC), this terminal being equipped on the one hand with a contactless read interface (such as a near-field communication interface NFC) or equipped with a camera (CAM) and, on the other hand, with a module for creating payment containers (MCPC). Depending on the embodiment, such a module can be a dedicated module, a wallet module or a bank module (the user's bank module available on his communications terminal). One advantage of the use of a bank module is that such a module is generally well secured. This means that, inasmuch as the payment container is very closely linked to the user's bank card and/or his bank account, it would seem to be simple (and legitimate) for the card-holder's bank module to be used, in one particular mode of operation, to create payment containers.

The creation of a payment container comprises the following:
- activating (C10) the module on the user's communications terminal;
- selecting (C10-1) an operation mode called a container creation mode within this module;
- selection and/or entry (C20), by the user, of the attributes of the container (date or time of validity, amount in the container, beneficiaries and/or category of beneficiary);
- assigning a value (if necessary) to the transmission attribute; the transmission attribute takes the default value "false" and if this attribute is positioned at "true", then a value is assigned to an identifier of a intended recipient;
- assigning (if necessary) a value to the debit attribute; the debit attribute takes the default value "false";
- obtaining (C30) a piece of bank card data (for example placing the user's bank card on the communications terminal; as an alternative to placing the bank card (in the case of NFC), the communications terminal camera can be used to take a picture of the user's bank card and carry out a character recognition operation;
- the validation (C40) by the user of the creation of the payment container; this requires for example pressure on a validation button;
- the transmission (C50) of the payment container to a processing server (SRVT).

1.2.2. The Processing By the Processing Server of the Container Created By the Communications Terminal Once the payment container has been created on the user's communications terminal, it is transmitted in a secured form to the processing server. The processing server implements a processing method which comprises the following:
- the reception of the payment container, comprising a step of decipherment, with one or more keys in the possession of the processing server;
- the assigning of an identifier used to identify the container uniquely;
- the retransmission of this identifier to the communications terminal of the user who has created the container;
- the storage of this container in an adapted data structure;
- the processing of the container, comprising especially, if the debit attribute is positioned at "true", a step for debiting the amount from the container.

The payment container is then ready for use, either by the communications terminal which has created it or by another channel.

1.2.3. Transmission By the Processing Server to an Intended Recipient of the Container Created By the Communications Terminal.

The processing of the payment container can also include a step for the transmission of the payment container, by the processing server (for example the bank server), to a receiver entity (for example another processing server or a bank server). The step of transmission of the payment container comes into play when the payment container is intended for use by another person. The processing server is then in charge of searching for this other person. This is done by using the "intended recipient" attribute which comprises an identifier of the user for whom the payment container is intended. This identifier can take several forms, two of which are specified below. The identifier is used by the processing server either directly to make a transmission of the payment container to the intended recipient (this is the simplest case corresponding to an intended recipient known to the processing server) or indirectly to obtain additional data used to make a transmission of the payment container.

In a first alternative embodiment, the identifier of the intended recipient is a bank identifier, known to the communications terminal which carries out the creation of the payment container. This bank identifier can for example be the bank identifier corresponding to an intended recipient close to the user (a relative, a child, etc.). The bank identifier can take the form of a simple account number (this is the case where the creator of the container and the intended recipient share the same bank). The bank identifier can also be a BIC or an IBAN (when the creator and the intended recipient do not share the same banking institution.

This means that, in this first alternative, the processing server either moves the container (i.e. allocates the container to another account) when the creator and the intended recipient are managed by the same banking institution, or transmits the payment container to a server of the intended recipient's banking institution.

In a second alternative embodiment, the identifier is a piece of data representing a contact of the user's communications terminal: the identifier is obtained after the selection by the user, of an intended recipient in the contact list. In this case the identifier can be a mobile telephone number, an electronic mail address, an instantaneous messaging identifier, etc.

Thus, in this second alternative, the processing server carries out at least the following actions:

creating an information message; the message contains an address (for example an URL) to which the intended recipient must link up; the address comprises a transmission identifier which is for example the result of a hash function, the parameters of which are the identifier of the intended recipient and an identifier of the payment container;

transmitting the information message to the intended recipient by using the identifier of the intended recipient (for example the message is an electronic mail when the identifier is an electronic mail address, the message is an SMS or an MMS when the identifier is a mobile telephone number, etc.).

Upon reception of this message, the intended recipient links up to the address that it contains and takes the necessary steps for the transmission of the payment container. In order to ensure the security of the exchange, the steps imply securing processes, including dual identification and encryption processes. Additionally, identifier-deletion processes can also be implemented.

1.2.4. Transmission, By the Communications Terminal, of the Container Created By the Communications Terminal to an Intended Recipient.

The processing of the payment container can also include a step of transmission of the payment container, by the communications terminal itself, to the communications terminal of the user who is the intended recipient.

To this end, when the user has validated a payment container comprising a transmission attribute positioned at "true", the selection of the intended recipient offers the possibility of selecting a transmission called a "local" transmission. The local transmission consists of the local transfer, to a second communications terminal situated in proximity, of the payment container. This second communications terminal is that of the intended recipient. The process is the following:

the communications terminal of the user who has created the container (i.e. the "user-creator") is made to approach the intended recipient's communications terminal; this step is preceded, if appropriate, by the launching of the process by a validation button;

the user-creator's communications terminal sends out a request, for example, an NFC or Bluetooth request, to the terminal of the user who is the intended recipient;

the terminal of the user who is the intended recipient responds to this request by transmitting a "intended recipient" identifier (this is for example an identifier of the bank module installed in the intended recipient's communications terminal which the intended recipient user can for example launch or which can get launched automatically);

the "intended recipient" identifier is inserted into the payment container, in the "intended recipient's" attribute;

the payment container is enciphered and then transmitted by NFC or Bluetooth to the intended recipient terminal.

This transmission is followed or preceded by a transmission, to the processing server, of the payment container so that the processing server can also process it. As an accessory the payment container also comprises a piece of data representing the processing server so that the intended recipient's communications terminal can be in a position to locate the container. Indeed, this transmission to the terminal of the intended recipient is complemented by an exchange of data at the level of the processing server or servers as described above.

1.3. Use of a Payment Container

Depending on the data that it contains, embodiments and operational conditions, the payment container can then be used to make payments with merchants. It can also be used to make online payments.

The use of a payment container with a merchant comprises:

the activation, on the user's communications terminal, of a module; this can be a bank module (i.e. the module of the bank with which the payment container is registered) or a wallet-type module;

the selection, within this module, of a mode of operation called contactless payment;

if necessary, the selection of a payment container to be used (when several containers can be used);

the presenting of the communications terminal before the contactless reader of the merchant's payment terminal; during this presenting step, the payment terminal detects the use of the payment container and, in relation with the processing server to which it is connected, carries out a payment process that is explained below (data-processing process implemented by the server).

Thus, the use of a payment container with a merchant is a simple operation which does not require any special effort on the part of the user. Indeed, instead of having to insert his bank card, it is enough for him to place his communications terminal on the payment terminal. Instead of entering a PIN code, it is enough for him to enter a password into the module for management of the payment containers (for example the bank module).

Thus use of a payment container for online payment comprises:

the activation, on the user's communications terminal, of a module; this can be a bank module (i.e. the bank module with which the payment container is registered) or a wallet-type module;

the selection, within this module, of a mode of operation called an online payment mode;

if necessary, the selection of a payment container to be used (when several containers can be used);

the generation of a piece of payment data by the module;

the entry, within a given entry zone of the website (a specific entry zone related to the type of payment by payment container), of the piece of payment data given by the module; after this entry, the merchant carries out a payment process, in relation with the processing server to which he is connected, this payment process being explained below.

Thus, the use of a payment container online is a simple operation which does not require great effort on the part of the user. Indeed, instead of entering bank card data, the user enters a piece of data representing a payment container.

The advantages procured by the use of a payment container are numerous. Indeed, the user does not need to use his bank card. Hence, very prudent users could, for example leave their bank cards in safe places and make sure that these cards will not be lost or stolen. One typical case of use of a payment container is that of a user who has no wish to be burdened with his bank card, for example during an afternoon at the beach, since he fears that it will be stolen from him. He therefore creates a container on his communications terminal. He creates a one-day container with an amount of 20 £ for example. If the user thereafter wishes to make a purchase on the beach, for example, a beverage, he can use his communications terminal to pay for it. Another advantage is that if the communications terminal is lost, the maximum amount that any malicious individual could use would be limited to the amount contained in the container. Besides, it should be borne in mind that smartphone-type communications terminals can be geolocated. Indeed, manufacturers and service providers are increasingly integrating technologies into their smartphones enabling them to be retrieved or found when misplaced or stolen. This means that even in the event of loss, the user has great chances of recovering his telephone.

Another case of use of the payment terminal is that of the transfer of money between two users. When a user wishes to transmit a sum of money to another, he creates a payment container in his communications terminal containing the sum that he wishes to transmit. He assigns the transmission attribute the value "true" and the debit attribute the value "true" or "false" as he wishes. He validates the creation of the payment container.

This payment container is transmitted to the processing server which detects the fact that the container has to be transferred and that it must be subjected to an immediate debit. The processing server then identifies the intended recipient (who, in this case, must be assigned a value for the "intended recipient" attribute for example by using a telephone number or another identifier like the one presented earlier.) Using this identifier, the processing server informs the user who is the intended recipient that he has benefited from a transfer of money through a payment container and then carries out the process of transmission of the payment container created by—the communications terminal to an intended recipient.

1.4. Processing of a payment container with a processing server

We shall first of all deal with the case of the processing of a payment container by a processing server when a payment operation is done by means of a payment container with a merchant. It is assumed as a prerequisite that the payment terminal is capable of accepting payment through a container. As a rule, this means that there has been a software update of the payment terminal (the great majority of terminals have contactless payment modules, and a change of payment terminal is therefore not necessary).

At the time of payment, the user informs the merchant that he wishes to pay using his payment container. The merchant activates the terminal so that he can receive this type of payment and then the user applies the method described above. When he presents the communications terminal before the payment terminal, the communications terminal sends the payment terminal the identifier of the payment container. The exchange of data between the payment terminal and the communications terminal is for example done according to the ISO/IEC 14443-4:2008 standard governing such exchanges. The identifier of the payment container is therefore for example transmitted by using this standard. Once this identifier has been obtained, the payment terminal implements a payment transaction, related to the processing server with which it is connected. The data transmitted to the processing server is appreciably identical to the data transmitted for payment by bank card except for the PAN of the bank card which is replaced by the identifier of the payment container. Besides, in the data transmitted, the merchant's terminal can also include a piece of data representing his MCC (Merchant Category Code). If this piece of data is not included in the data transmitted by the payment terminal, then the processing server searches for it.

On the bank server side, the processing method is the following:
  reception (T01) of data coming from the payment terminal, comprising the identifier of the payment container;
  obtaining (T02) a merchant's identifier, possibly accompanied by a merchant category code when it is not given by the merchant;
  depending on the identifier of the payment container, determining (T03) an identifier of a bank institution to which the payment container is attached;
  depending on the bank identifier of the payment container, obtaining (T04) an authorization of payment; and
  when the authorisation of payment is delivered, a step (T05) for sending the merchant's terminal a piece of data representing acceptance of the transaction;
  when the payment authorisation is negative, a step (T06) for sending the merchant's terminal a piece of data representing a rejection of the transaction.

Thus, from the merchant's viewpoint, the transaction takes place in the same way as a transaction using a bank card. As explained above, the authorisation of payment is obtained according to the identifier of the banking institution:
  when the bank of the payment container is the same as the bank of the processing server (T041):
    obtaining (T0411) attributes of the container;
    verifying (T0412) the balance remaining in the payment container;
    when the balance remaining in the payment container is greater than the amount of the transaction (T0413);
      verifying (T0414) that none of the attributes of the payment container contradicts the data of the transaction (a maximum amount, authorised merchant category, etc.);
      when none (T0415) of the payment attributes has been infringed, issuing the authorisation to pay;
      subtraction (T0416) an amount of the transaction from the balance remaining in the payment container;
    when the remaining balance in the payment container is smaller than the amount of the transaction (T0417), transmission of an absence of authorisation;
  when the bank institution of the payment container is different from the bank institution of the processing server (T042):
    identifying (T0421) the processing server to which the transaction data must be transmitted;
    transmitting (T0422) transactional data to this processing server;
    receiving (T0423) authorisation or refusal of payment.

The steps implemented by the processing server which is a receiver of transaction data are appreciably identical to those described above.

1.5. Other Embodiments of a Payment Container

Below, we present other modes of use of a payment container in compliance with the present technique. These other modes tend to eliminate the use of a communications terminal.

According to a first variant, the use of the payment container by the user is done by means of a biometric authentication on the merchant's premises. At a first stage, the user creates a payment container, this payment container being possibly limited geographically, temporally or by its amount (as explained above). Then, the user goes to a merchant. At the time of payment the user indicates that he wishes to make payment by payment container and that he wishes to be authenticated by biometry.

The user is then subjected to a biometric identification (typically a finger-print reading) which activates the payment. The system comes up against a technical difficulty: when the number of users increases, the identification of the holder at the merchant's premises becomes tedious because the processing time is lengthy and also a source of error. Indeed, the entity that makes the biometric comparison (a server for example) must compare the finger print collected from the shop with all those placed in the database. Thus, on the server side, it is proposed to accelerate this comparison by several means:

(a) making the user enter a four-digit PIN code: the effort of the comparison is then divided by 10,000;
(b) making the merchant enter a piece of information on the payment terminal, for example "the customer is a male" or "the customer is a female": in this case, the effort of comparison is halved;
(c) on the assumption that the user has his mobile communications terminal with him, the comparison can be limited solely to the finger prints of mobile telephone owner in proximity to the merchant's payment terminal;
(d) the user is requested to enter the initials (first letter of surname, first letter of first name) in order to limit t(he effort of comparison in the database; this piece of information divides the effort of comparison by $26^2=676$ if it is assumed that the distribution of the first letters of the names and first names is uniform. In practice, this is not necessarily the case but the reduction is nevertheless great.

In such a use, it is assumed that the process of creation of the payment container has possibly been modified so that it includes a new attribute related to the creator's finger prints. The finger prints as such are either already available in the communications terminal or pre-recorded at the processing server.

In a second variant, the payment container created by means of a communications terminal can be used by two different persons: in this case, the two different persons are either the creator and another person of the creator's choice, or two persons different from the creator. Then the "intended recipient" attribute can include an identification of several persons. The use of the container is thus done exclusively on behalf of the creator (with no transmission possible). In the event of double biometric authentication (as proposed in the previous variant), two pieces of data representing finger prints are used instead of only one.

Naturally, the number of users is not limited to two.

Such a use implies possible modification of the process of creation of the payment container so that it can contain a new attribute related to the finger prints of the creator and of the authorised person. The finger print as such can be either available on the communications terminal or pre-recorded in the processing server.

According to a third variant the payment container can be recurrent. This means that the payment container comprises an attribute of periodicity enabling the processing server to create a new payment container independently by making a copy of a current payment container. This use is for example interesting for the regular use of an item of goods or a service without its being necessary to use a bank card for this purpose. Let us take the example of an office worker who has lunch every day near his workplace. The processing server creates a payment container every day, from Monday to Friday, so that the user can make purchases without using his payment card. In a fourth variant, the use of the payment container is monitored by the processing server so that the server can implement anti-fraud steps. Thus, when a payment container, for example a periodic container, is used in a way that is different from the creator's habitual ways (for example in terms of place of use or range of amounts spent), a confirmation of payment can be requested from the user or the container can even be blocked by the processing server.

1.6. Devices for Implementation.

Referring to FIG. 4, we describe a device for creating and using a payment container comprising means for executing the methods described above with reference to the creation of a payment container or processing of the use of the payment container by a user.

For example, the device for creating and using a payment container comprises a memory 41 constituted by a buffer memory, a processing unit 42, equipped with a microprocessor and driven by the computer program 43 implementing the steps needed to create a payment container on the one hand and to use it on the other.

At initialisation, the code instructions of the computer program 43 are, for example, loaded into a memory and then executed by the processor of the processing unit 42. The processing unit 42 inputs, for example, a request for creation or use of a payment container. The processor of the processing unit 52 implements the steps of the method of creation according to the instructions of the computer program 53 to enable the creation or use of such a container.

To this end, the processing device comprises, in addition to the buffer memory 41, means for obtaining a piece of information external to the device such as a set of data accessible in a data base; these means can take the form of a module for access to a communications network such as a network card. The device also comprises processing means for processing these pieces of data to deliver data used to select or enter payment container attributes; these processing means comprise for example a processor specialised in this task; the device also comprises one or more means of access to one or more data bases such as contact databases and/or bank account databases and/or bank card databases. The device also comprises a contactless reading module and/or a module for taking pictures, such as a camera.

These means can be driven by the processor of the processing unit 42 as a function of the computer program 43.

Referring to FIG. 5, we describe a device for processing a payment container comprising means for executing the methods described here above with reference to the processing of a payment container with a processing server.

For example, the processing device comprises a memory 51 constituted by a buffer memory, a processing unit 52, equipped for example with a microprocessor and driven by the computer program 53 implementing programs necessary to obtain authorization of payment.

At initialisation, the code instructions of the computer program 53 are for example loaded into a memory and then executed by the processor of the processing unit 52. The processing unit 52 inputs for example a request for using of a payment container. The microprocessor of the processing unit 52 implements the steps of the method for processing the payment container according to the instructions of the computer program 53 to enable to obtain an authorization of payment.

To this end, the processing device comprises, in addition to the buffer memory 51, adapted processing means; these means can take the form of a processor or a set of secured resources used to secure the processing of payment containers. The device also comprises cryptographic processing means. These processing means comprise for example a dedicated encipherment processor and encipherment keys such as session keys derived from an initial key.

These means can be driven by the processor of the processing unit 52 as a function of the computer program 53.

The invention claimed is:

1. A method for creating a payment data structure called a payment container, the method for creating being implemented by a secured processor of a mobile communications terminal, said payment container comprising at least one piece of data representing a user's bank identifier, the method comprising:
  selecting, by a user, via a man-machine interface, of at least one public attribute of said payment container, said selection comprising selection of at least one attribute value for at least one of the following parameters:
    category of beneficiary of the payment container;
    beneficiary of the payment container;
  determining, by the secured processor of the communications terminal, of at least one private security attribute, unmodifiable by said user, wherein the at least one private security attribute comprises a location corresponding to creation of the payment container;
  obtaining, by the secured processor of the communications terminal, of at least one piece of data representing the user's bank card, said obtaining comprising:
    transmission, to the user's bank card and via a near-field communication (NFC) contactless data transmission interface connected to said secured processor, of a request for obtaining data in the form of a signal,
    receiving a response via said NFC contactless data transmission interface, from the user's bank card, to said request, in the form of a modulated signal, and
    decoding, by the secured processor, said modulated signal delivering said at least one piece of data;
  validation, by the user, via said man-machine interface, of the creation of the payment container;
  creating, by the secured processor, the payment container by:
    combining the at least one piece of data representing the user's bank card, the at least one public attribute of said container, and the at least one private security attribute thereby generating combined data; and
    encrypting said combined data, thereby generating said payment container; and
  transmission, by said communications terminal, of said payment container to a payment container processing server.

2. The method of claim 1, wherein the method further comprises determining, via said communications terminal, of a value representing an attribute of transmission of said payment container.

3. The method of claim 2, wherein the method further comprises, when the value representing the transmission attribute of said payment container is positive, determining, by said communications terminal, of a value representing an attribute of debit from said payment container.

4. The method of claim 1, wherein the method further comprises, prior to the selection of a container parameter:
  activation, on the user's communications terminal, of a module for managing the payment container;
  selection, within this module, of a mode of operation called a container creation mode.

5. The method of claim 4, wherein the activation of the management module is accompanied by the authentication of said user to whom said communications terminal and said payment card belong.

6. The method of claim 1, wherein the selection by a user and via a man-machine interface of at least one public attribute of said container comprises the selection of at least one attribute value for at least one of the following parameters:
  date of validity of the payment container;
  duration of validity of the payment container;
  amount of the payment container.

7. The method of claim 1, wherein the method further comprises:
  receiving data from the mobile communications terminal, comprising the identifier of the payment container;
  obtaining a merchant's identifier and/or a merchant category code;
  depending on the identifier of the payment container, determining an identifier of a banking institution to which the payment container is attached;
  depending on the banking identifier of the payment container, obtaining an authorization of payment, said obtaining an authorization of payment comprising verifying that at least one of said merchant's identifier and merchant category code is among attributes values of the following parameters of said payment container:
    category of beneficiary of the payment container, as for said merchant category code;
    beneficiary of the payment container, as for said merchant's identifier; and
  when the authorization of payment is delivered, transmission to the merchant's terminal, of a piece of data representing acceptance of the transaction.

8. The method of claim 7, wherein obtaining an authorization of payment comprises:
  when the banking institution of the payment container is the same as the banking institution of the processing server:
    obtaining attributes of the container;
    verifying the balance remaining within the payment container;
    when the balance remaining within the payment container is greater than the amount of the transaction:
      verifying that none of the attributes of the payment container contradicts the data of the transaction;
      when none of the payment attributes is infringed, issuing authorization of payment;
      subtracting an amount of the transaction from the balance remaining within the payment container;
    when the balance remaining within the payment container is smaller than the amount of the transaction, transmitting an absence of authorization.

9. The method of claim 8, wherein obtaining a payment authorization comprises:
  when the banking institution of the payment container is different from the banking institution of the processing server:
    identifying the processing server to which the transaction data must be transmitted;

transmitting data of the transaction to the processing server;

receiving authorization or rejection of payment.

10. The method of claim 1, wherein the at least one private security attribute comprises a date of creation of the payment container.

11. A communications terminal for the creation of a payment data structure called a payment container, said payment container comprising at least one piece of data representing a user's bank identifier, said communications terminal comprising a secured processor configured to enable:

selection, by a user and via a man-machine interface, of at least one public attribute of said container, said selection comprising the selection of at least one attribute value for at least one of the following parameters: category of beneficiary of the payment container; beneficiary of the payment container;

determining, by the secured processor of the communications terminal, of at least one private security attribute, unmodifiable by said user, wherein the at least one private security attribute comprises a location corresponding to creation of the payment container;

obtaining, by the secured processor of the communications terminal, of at least one piece of data representing the user's bank card, said obtaining comprising:

transmission, to the user's bank card and via a near-field communication (NFC) contactless data transmission interface connected to said secured processor, of a request for obtaining data in the form of a signal, receiving a response to said request, from the user's bank card, in the form of a modulated signal, and decoding, by the secured processor, said modulated signal delivering said at least one piece of data;

validation, by the user, via said man-machine interface, of the creation of the payment container;

creating, by the secured processor, the payment container by:

combining the at least one piece of data representing the user's bank card, the at least one public attribute of said container, and the at least one private security attribute, thereby generating combined data; and encrypting said combined data thereby generating said payment container; and transmission, by said communications terminal, of said payment container to a payment-container processing server.

12. The communications terminal of claim 11, wherein the at least one private security attribute comprises a date of creation of the payment container.

* * * * *